United States Patent
Heidloff et al.

(10) Patent No.: US 7,526,472 B2
(45) Date of Patent: Apr. 28, 2009

(54) SHARED BOOKMARKS BASED ON USER INTEREST PROFILES

(75) Inventors: Niklas Heidloff, Satzkotten (DE); Michael R. O'Brien, Westford, MA (US); Gregory R. Klouda, Lancaster, MA (US); Oliver Kieselbach, Hoevelhof (DE)

(73) Assignee: International Business Machines Corporation, Armonk, NY (US)

( * ) Notice: Subject to any disclaimer, the term of this patent is extended or adjusted under 35 U.S.C. 154(b) by 245 days.

(21) Appl. No.: 11/078,789

(22) Filed: Mar. 11, 2005

(65) Prior Publication Data

US 2006/0206480 A1    Sep. 14, 2006

(51) Int. Cl.
    *G06F 7/00* (2006.01)
(52) U.S. Cl. .......................................... 707/3
(58) Field of Classification Search ...................... 707/3
    See application file for complete search history.

(56) References Cited

U.S. PATENT DOCUMENTS

| | | | |
|---|---|---|---|
| 6,493,702 B1 * | 12/2002 | Adar et al. ...................... | 707/3 |
| 6,557,028 B2 | 4/2003 | Cragun | |
| 6,631,496 B1 | 10/2003 | Li et al. | |
| 6,725,227 B1 * | 4/2004 | Li .............................. | 707/102 |
| 6,961,751 B1 * | 11/2005 | Bates et al. ................. | 709/203 |
| 7,069,308 B2 * | 6/2006 | Abrams ...................... | 709/218 |
| 2002/0174185 A1 * | 11/2002 | Rawat et al. ................ | 709/206 |
| 2003/0167324 A1 * | 9/2003 | Farnham et al. ............. | 709/224 |
| 2005/0022132 A1 * | 1/2005 | Herzberg et al. ............ | 715/759 |

OTHER PUBLICATIONS

Philipp Zambelli, Shared Bookmarks, Building an Application on a Distributed Object System, Dec. 1999, 89 pages, Master's Thesis in Telematics for the Award of the Academic Degree Diploma Ingenieur at the Graz University of Technology.

* cited by examiner

*Primary Examiner*—Charles Rones
*Assistant Examiner*—Fazlul Quader
(74) *Attorney, Agent, or Firm*—David A. Dagg

(57) ABSTRACT

A method for providing personalized, shared bookmarks that determines which bookmarks are to be shared with a given user based at least in part on an interest profile associated with that user. The interest file can be used to define important other users, based on attributes, titles, or names associated with those other users. Shareable bookmarks defined by important other users are provided to the local user through the local navigation program. The list of important persons used to define which bookmarks should be shared may be determined in various specific ways. An interest profile may be automatically maintained containing a list of persons that are important for a specific user. The list may be automatically calculated based on information such as recent email traffic, and/or can be defined manually. Privacy issues may be addressed by enabling a user to prevent certain bookmarks they define locally from being shared.

6 Claims, 2 Drawing Sheets

SHARED BOOKMARKS BASED ON USER INTEREST PROFILES

FIELD OF THE INVENTION

The present invention relates generally to computer application program interfaces, and more specifically to a system and method for providing shared bookmarks based on user interest profiles.

BACKGROUND OF THE INVENTION

In many contemporary computer application programs, users are allowed to maintain a set of names and/or pointers associated with documents, databases, and various other types of program or data objects that they desire to have quick access to. These conveniently accessible links, sometimes referred to as "bookmarks", provide convenient access to any arbitrary document or location that can be referred to using a Uniform Resource Locator (URL). For example, using Netscape® Navigator and Mozilla Firefox Web browsers, a bookmark is a link to a Web page that has been added to a folder or list of saved links. When a user is looking at a particular Web site or home page, and wants to be able to quickly get back to it later, they can create a bookmark for it, and store the bookmark in a software construct referred to as a "bookmark list" or "hotlist." The Microsoft® Internet Explorer browser, and others, also use the same idea, using different names to refer to the stored links. The Internet Explorer browser uses the term "favorite" to refer to this concept. In the present disclosure, the term "bookmark" is intended to refer to any link stored for quick access that includes or refers to a URL, and that may be directly selected by a user through a user interface, for example by a mouse click, in order to access an associated content location or document.

Existing systems allow for storage of bookmarks that are maintained privately, on a user by user basis. In order for a user to share their personal bookmarks with other users, they must typically send the links via electronic mail ("email"), and the receiving users must then manually add the links to their bookmark lists.

Some potential approaches to sharing bookmarks are to associate access control lists (ACLs) with bookmarks, or to simply make all bookmarks publicly available. A significant problem with such approaches is that they are not personalized. Accordingly, if a user shares one or more bookmarks, all other users see all the shared bookmarks. This may result in a flood of bookmarks in the user's bookmark list, and makes sharing bookmarks virtually useless. Other systems have provided replication of a user's personal bookmarks between a server and different clients, for example to support a roaming user, but they do not support sharing of bookmarks.

For the reasons stated above, it would be desirable to have a new system for sharing bookmarks that does not result in flooding of personal bookmark lists with shared bookmarks.

SUMMARY OF THE INVENTION

To address the above described an other shortcomings of the prior art, a system and method are disclosed for providing personalized, shared bookmarks. The disclosed system determines which bookmarks are to be shared with a given user based on an interest profile associated with that user. The interest profile can be used to define important other users, for example based on attributes, titles, or names associated with those other users. Shareable bookmarks defined by such important other users are then provided to the local user through the local navigation program. For example, bookmarks of a technical leader associated with a specific project, or of other team members for that project, or of people with similar roles to the user but belonging to other teams may be considered important for the user. This reflects the likelihood that the more important certain people are to a user, the more likely it is that their bookmarks are also important for that user.

The list of important persons used to define which bookmarks should be shared may be determined in various specific ways. For example, an interest profile may be automatically maintained containing a list of persons that are important for a specific user. The list may be automatically calculated based on information such as recent email traffic, and/or can be defined manually.

The disclosed system may be embodied to address privacy issues by enabling a user to prevent certain bookmarks they define locally from being shared. Accordingly, a user can mark bookmarks as being public or private. If a given bookmark is marked as public, then it is allowed to be automatically replicated into other users bookmark lists based on user interest profile data.

In this way there is disclosed a new system for sharing bookmarks that does not result in flooding of bookmark lists with shared bookmarks.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF EXEMPLARY EMBODIMENTS

Figure 1:
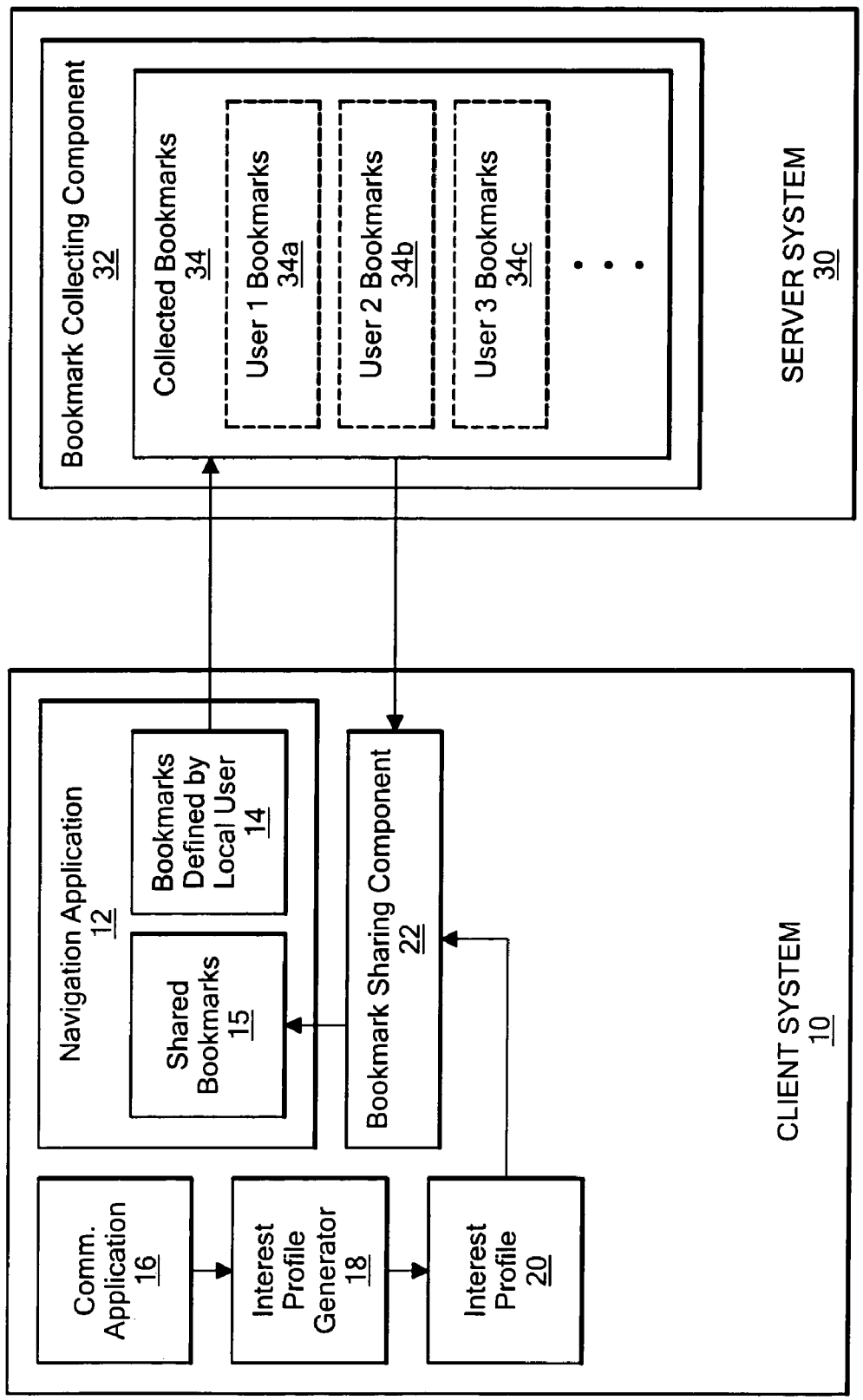
FIG. 1 shows software components in an illustrative embodiment.

As shown in FIG. 1, an illustrative embodiment of the disclosed system operates using a number of software components executing on at least one client computer system, shown for purposes of illustration as the client system 10, and at least one server computer system, shown for purposes of illustration as server system 30. The client system 10 and server system 30 may, for example, each include at least one processor, program storage, such as memory, for storing program code executable on the processor, and one or more input/output devices and/or interfaces, such as data communication and/or peripheral devices and/or interfaces. The client system 10 and server system 30 are communicably connected by a data communication system, such as a Local Area Network (LAN), the Internet, or the like. The client system 10 and server system 30 may further include appropriate operating system software.

The client system is shown including a navigation application program 12, which enables a user of the client system to define and access a number of locally defined bookmarks 14. The navigation application program 12 further provides access to a number of shared bookmarks 15. The navigation application 12 may consist of any specific type of application program that a local user of the client system 10 can use to navigate between different resources, such as data files, electronic documents, Web pages, databases, programs, services, or the like. An example of the navigation application 12 is a Web browser program. The bookmarks 14 and 15 consist of quickly accessible links to resources. The resources pointed to by the bookmarks 14 and 15 may conveniently be accessed by a user through a user interface provided by the navigation application 12, for example using one more mouse clicks. In one embodiment, the bookmarks 14 and 15 each include a Uniform Resource Locator (URL).

A communication application 16 is monitored by an interest profile generator component 18 to generate the interest profile 20. The communication application 16 may consist of any specific type of communication program, such as an electronic mail ("email") application program, instant messaging ("IM") program, or the like. The interest profile generator 18 operates to determine one or more important persons for the interest profile 20 based on which other users a local user of the client system 10 has been communicating with through the communication application 16. For example, the interest profile generator 18 may operate to determine those other users to which messages are sent, and/or from which messages are received using the communication application 16. Such other users to be considered as important users for the local user may be indicated within the "TO:" or "FROM:" fields of email messages sent and received by the communication application 16. When determining a set of important persons to be indicated within an interest profile for a local user, the interest profile generator 18 may use statistical information such as how frequently a given other user communicates with the local user via the communication application 16, how recently a given other user has been in communication with the local user via the communication application 16, or other attributes of communications performed using the communication application 16. Alternatively, or in addition, the interest profile generator 18 may obtain indications of important persons to be indicated by the interest profile 20 as configuration information, for example as obtained from the local user through the navigation application 12 or communication application 16, or from a system administrator.

A bookmark sharing component 22 obtains indications of the important persons for the local user from the interest profile 20, and operates to obtain and store the shared bookmarks 15 such that they are available to the navigation application 12. The shared bookmarks 15 are bookmarks that have been defined by other users that match the important persons indicated in the interest profile 20. The bookmark sharing component 22 obtains the shared bookmarks 15 from the server system 30.

The server system 30 includes a bookmark collecting component 32 that stores a database of bookmarks, shown as the collected bookmarks 34. The collected bookmarks 34 are obtained by the server system 30 from multiple client systems, including the client system 10. The collected bookmarks 34 include bookmarks associated with users of those multiple client systems, other than the local user associated with the interest profile 20. The collected bookmarks 34 are shown, for purposes of illustration, as including user 1 bookmarks 34*a*, user 2 bookmarks 34*b*, user 3 bookmarks 34*c*, etc. The bookmarks in the collected bookmarks 34 may, for example, be collected for multiple users and/or multiple client systems associated with the server system. Collection of the bookmarks at the server system 30 may be accomplished by navigation applications on client systems transmitting their bookmarks to the server system, either periodically, and/or in response to a request or read operation from a scheduled agent executing on the server system 30. In this way, bookmarks are up-loaded from a number of client systems, and maintained in a bookmark database on the server system 30 in association with the users that defined them. After an initial set of bookmarks for a given user is loaded into the collected bookmarks 34, only changes to that initial set need to be communicated to and/or stored in the collected bookmarks 34. In the illustrative embodiment, the bookmarks for a given user that are loaded into the collected bookmarks 34 include those bookmarks that are created or defined by that user, shown for example as the locally defined bookmarks 14. Moreover, the bookmarks associated with a given user in the collected bookmarks 34 may be created or defined by that user on various specific client systems, collected centrally from those multiple client systems into the server system 30, and associated with that user in the collected bookmarks 34.

The bookmark sharing component 22 operates to generate the shared bookmarks 15 by comparing the important persons indicated in the interest profile 20 of the local user of the client system 10 with the other users (user 1, user 2, user 3, etc) associated with the collected bookmarks 34 in the server system 30. If an important person indicated by the interest profile 20 has one or more bookmarks stored in the collected bookmarks 34, those associated bookmarks are downloaded by the bookmark sharing component 22, and stored within the shared bookmarks 15. Those skilled in the art will recognize that the bookmarks 14 and 15 may be organized in categories, as in a tree structure, folders, or any other appropriate organizing structure, in order to provide a convenient presentation to the local user that makes the shared bookmarks 15 conveniently identifiable as shared bookmarks.

While the bookmark sharing component 22, interest profile generator 18, and interest profile 20 are shown, for purposes of illustration, located within the client system 10 in FIG. 1, the present invention is not limited to such an embodiment. Accordingly, these components may alternatively, and/or additionally, be located in whole or in part within the server system 30. For example, in order to support user sessions established by a given user on different client systems, the interest profile 20, bookmarks 14, and shared bookmarks 15, may be stored on the server system 30, for downloading or replicating to, and/or use in conjunction with, one or more client systems on which an associated user logs in or establishes a user session with the server system 30. In such an embodiment, the identification of shared bookmarks for a given user may be performed by one or more software components executing on the server system 30.

Figure 2:
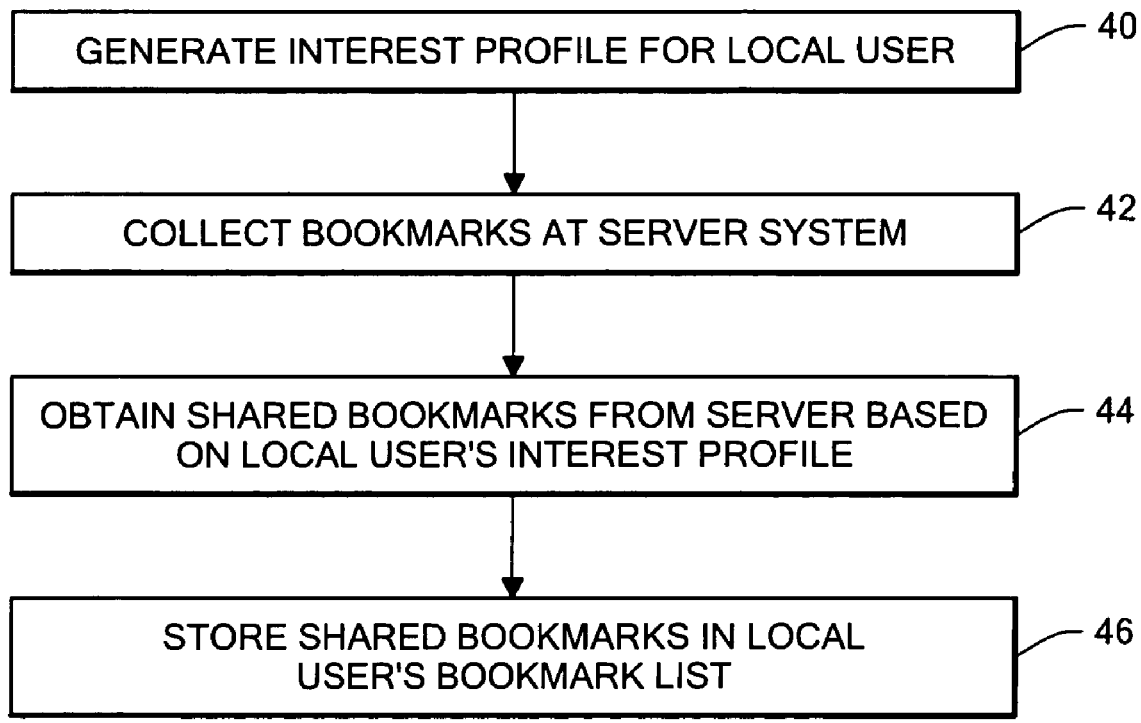
FIG. 2 shows steps performed in the illustrative embodiment.

FIG. 2 is a flow chart illustrating steps performed by an illustrative embodiment of the disclosed system. As shown in FIG. 2, at step 40 the disclosed system generates an interest profile for a local user of a client system. The interest profile generated at step 40 includes indications of one or more important persons. Such indications may, for example, consist of user names or other identifiers corresponding to the important persons. The important persons indicated by the interest profile may be determined based on how frequently and/or how recently other users have been in communication with the local user, for example through one or more communication applications used by the local user. The important person indications may alternatively or additionally be based on configuration information received from the local user or a system manager.

At step 42, bookmarks for multiple users are collected at a server system. The collection of bookmarks at step 42 may be accomplished using a scheduled agent running on the server system that checks for updates to the bookmarks of the multiple users. Each collected bookmark is stored in a database on the server system in association with the user that defined it. Accordingly, all bookmarks defined by a given user can conveniently be obtained from the database on the server system.

At step 44, the local user's interest profile is used to determine which of the collected bookmarks are to be shared with the local user. To this end, the important persons in the interest profile are compared with the names of users for whom bookmarks are stored in the bookmark database. Those bookmarks associated with other users matching the important persons from the interest profile are copied to the client system currently being used by the local user. The shared bookmarks are made available to the local user at step 46, when the disclosed system operates to store them as shared bookmarks, for example within the local user's bookmark list. The shared bookmarks within the bookmark list may then be made available to the local user through a navigation program such as a Web browser.

FIGS. 1-2 are block diagram and flowchart illustrations of methods, apparatus(s) and computer program products according to an embodiment of the invention. It will be understood that each block of FIGS. 1-2, and combinations of these blocks, can be implemented by computer program instructions. These computer program instructions may be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art should readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media for example using wireless, baseband signaling or broadband signaling techniques, including carrier wave signaling techniques, such as over computer or telephone networks via a modem.

While the invention is described through the above exemplary embodiments, it will be understood by those of ordinary skill in the art that modification to and variation of the illustrated embodiments may be made without departing from the inventive concepts herein disclosed. Moreover, while the preferred embodiments are described in connection with various illustrative program command structures, one skilled in the art will recognize that they may be embodied using a variety of specific command structures.

We claim:

1. A computer-implemented method of providing shared bookmarks, comprising:

determining an interest profile of a local user, said interest profile stored in a memory, wherein said interest profile is determined responsive to communications with said local user through a plurality of communication applications including an electronic mail application and an instant messaging application, and wherein said interest profile is also determined responsive to configuration information provided from a system manager, wherein important persons in said interest profile include users determined to have frequently communicated with said local user through said plurality of communication applications, wherein said important persons in said interest profile further include users determined to have recently communicated with said local user through said plurality of communication applications, and wherein said important persons in said interest profile further include users indicated as important persons in said configuration information provided from said system manager;

collecting a plurality of shared bookmarks initially defined by a plurality of other users, wherein each of said shared bookmarks is a link to an associated Web page, and wherein each of said shared bookmarks is initially defined by a defining one of said plurality of other users adding said shared bookmark into a list of bookmarks associated with, automatically maintained for, and displayed to said defining one of said plurality of other users by a Web navigation application program;

determining a subset of said collected plurality of shared bookmarks by comparing said important persons in said interest profile of said local user with the identities of said other users that initially defined each of said collected plurality of shared bookmarks, wherein all bookmarks in said subset are initially defined by important persons indicated by said interest profile; and making said subset of said collected plurality of shared bookmarks available to said local user through said Web navigation application program as shared bookmarks displayed within a local list of bookmarks associated with, automatically maintained for, and displayed to said local user by said Web navigation application program, wherein said local list of bookmarks includes only bookmarks from said subset of said collected plurality of shared bookmarks and bookmarks defined by said local user.

2. The method of claim 1, further comprising:

enabling each user that initially defines a corresponding one of said collected plurality of shared bookmarks to indicate that said corresponding one of said collected plurality of shared bookmarks is to be shared.

3. The method of claim 2, further comprising:

enabling users to indicate that bookmarks they initially define are private, wherein private bookmarks are not included in said collected plurality of shared bookmarks.

4. The method of claim 1, wherein each of said collected plurality of shared bookmarks includes a Uniform Resource Locator (URL).

5. The method of claim 1, wherein said user determined to have recently communicated with said local user include users indicated in fields of electronic mail messages sent by the electronic mail application.

6. The method of claim 1, wherein said important persons in said interest profile are indicated by corresponding user names of said important persons stored in said interest profile.

* * * * *